United States Patent [19]

Sahori

[11] Patent Number: 4,568,164
[45] Date of Patent: Feb. 4, 1986

[54] MOTOR DRIVE CAMERA

[75] Inventor: Daisuke Sahori, Kanagawa, Japan

[73] Assignee: Canon Kabushiki Kaisha, Tokyo, Japan

[21] Appl. No.: 696,872

[22] Filed: Jan. 31, 1985

Related U.S. Application Data

[63] Continuation of Ser. No. 341,900, Jan. 22, 1982, abandoned.

[30] Foreign Application Priority Data

| Jan. 27, 1981 | [JP] | Japan | 56-10484 |
| Jan. 27, 1981 | [JP] | Japan | 56-10485 |
| Jan. 27, 1981 | [JP] | Japan | 56-10486 |

[51] Int. Cl.⁴ .............................................. G03B 1/12
[52] U.S. Cl. .................. 354/173.1; 354/214
[58] Field of Search ................... 354/170, 171, 173.1, 354/173.11, 214; 352/124; 242/71.6

[56] References Cited

U.S. PATENT DOCUMENTS

| Re. 27,229 | 11/1971 | Mitchell et al. | 352/124 |
| 3,794,231 | 2/1974 | Martin | 352/124 X |
| 4,171,893 | 10/1979 | Kawazoe | 354/173 |
| 4,416,525 | 11/1983 | Chan | 354/214 X |

Primary Examiner—John Gonzales
Attorney, Agent, or Firm—Toren, McGeady, Stanger, Goldberg & Kiel

[57] ABSTRACT

A motor driven camera for winding and rewinding film by an electric motor includes a mechanism for detecting the end of a length of loaded film to produce an actuating signal. An automatic changeover mechanism responds to the actuating signal by changing the state of a film transport mechanism in the camera from a film winding operating mode to a film rewinding operating mode. The automatic changeover mechanism is arranged to be operated in response to closing of the back cover of the camera. Accordingly, the transition from the winding to the rewinding operating modes is controlled automatically.

3 Claims, 9 Drawing Figures

WHEN WINDING

WHEN WINDING STOPS

AFTER RELEASE

WHEN REWINDING

MOTOR DRIVE CAMERA

This is a continuation of application Ser. No. 341,900, filed Jan. 22, 1982, abandoned.

BACKGROUND OF THE INVENTION

1. Field of the Invention

This invention relates to cameras capable of automatic winding and rewinding of film by a motor drive, and more particularly to a motor driven camera with means for automatically switching the camera to the rewinding mode upon detection of the end of a length of film in the camera.

2. Description of the Prior Art

Many of the conventional motor driven cameras perform the film winding operation by use of a motor. When the length of film in the camera is at an end, as detected by the photographer, a manual actuation of the rewind control button (R button) is required, so that the film transport mechanism is changed over from the winding mode to the rewinding mode. The rewind crank is then operated to perform a rewinding operation, or the motor is coupled to the rewinding mechanism to perform the film rewinding operation. The manual control of the transition from the winding to the rewinding mode, which has always been required when the exposed film was to be exchanged with fresh film, had no direct bearing on the taking of pictures, constituted a complicated process for film exchange, and was very inconvenient when a hurried preparation for shooting had to be made.

It is also known to provide an automatic transition control method, in which the maximum possible number of frames in the loaded film is preset on the camera. When that number is reached, selection of the rewinding mode is automatically effected. The use of this method, however, gives rise to the problems that the photographer often sets an erroneous number of film frames, or overlooks the setting of the frame number, and the roll film then does not provide more than the preset number of frames even though a number of more frames are available.

SUMMARY OF THE INVENTION

A first object of the present invention is to eliminate the above-described drawbacks and to arrange a member for detecting the end of a length of film, which member is responsive to opening and closing of the back cover of a camera so that the film transport mechanism is changed over automatically from a winding mode of operation to a rewinding mode of operation.

A second object of the present invention is to arrange a drive circuit of the changeover means for changing over the film transport mechanism from the winding to the rewinding operating modes upon detection of the film end, to be actuated by a previously charged member.

A third object of the present invention is to make it possible to select the rewinding mode by changing over from the winding mode at a desired film position, before all of the film is exposed.

DESCRIPTION OF THE PREFERRED EMBODIMENT

Figure 1:
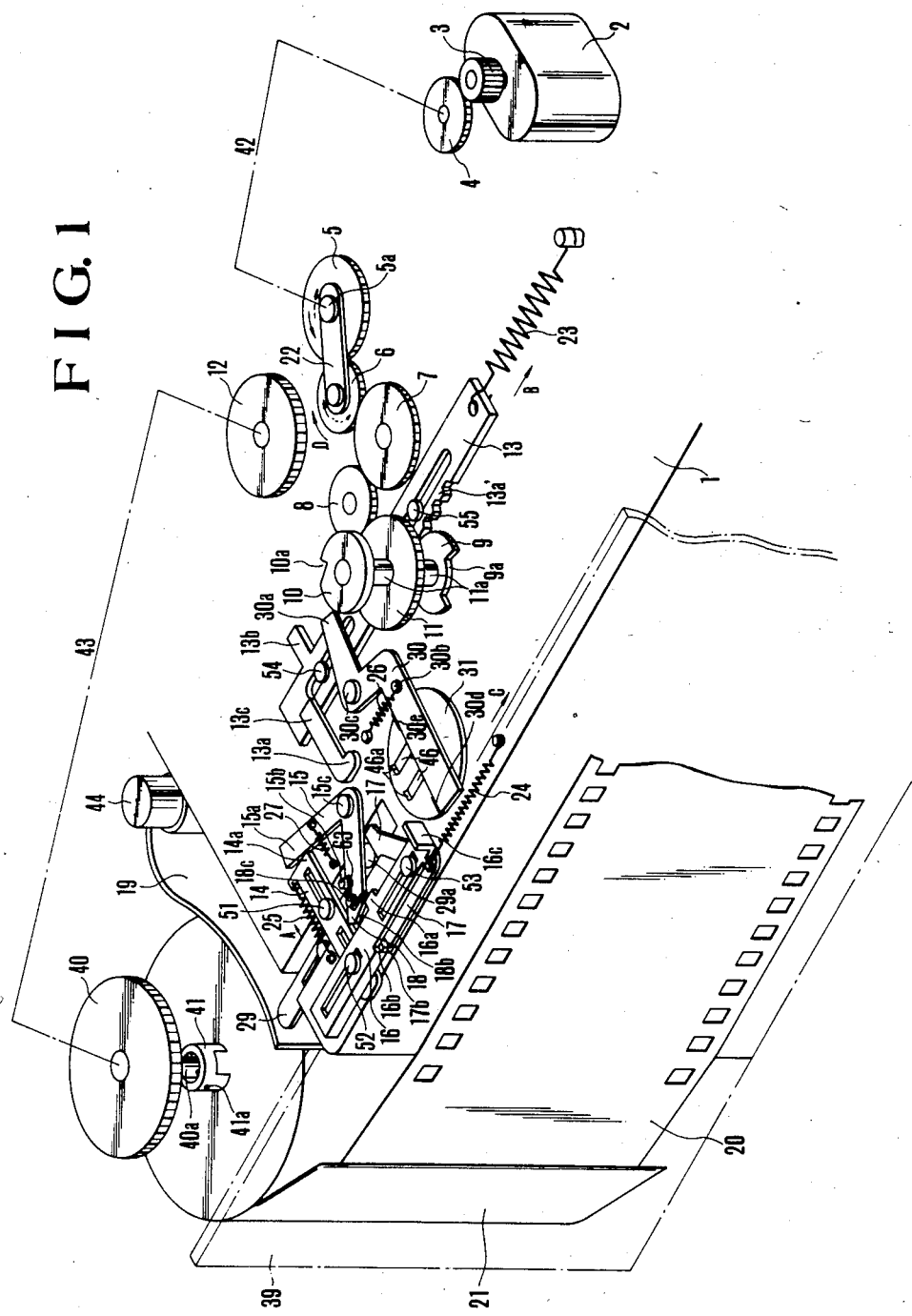
FIG. 1 is a perspective view of the main part of an embodiment of a motor driven camera according to the present invention.
Figure 2A:
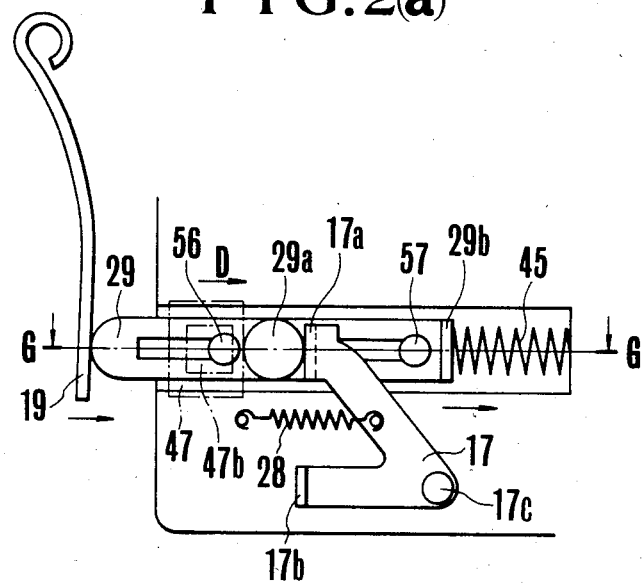
FIG. 2(a) is an enlarged, top view of a film detecting mechanism in the embodiment of FIG. 1.
Figure 2B:
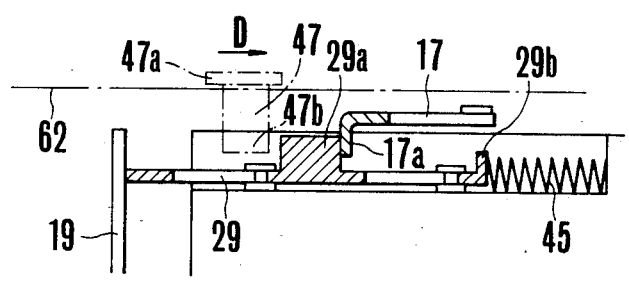
FIG. 2(b) is a sectional view of the mechanism of FIG. 2(a) as taken along line G—G.

FIG. 1 illustrates the construction and arrangement of essential parts of the motor driven camera of the invention, showing a camera body 1; a reversible motor 2; a pinion 3 mounted on the output shaft of the reversible motor 2; and gears 4, 5, 6, 7, 8, 11 and 12 of a film transport system, in particular the gear 6 being a planetary gear meshing with the gear 5 and liked to the gear 5 by a connector 22. When the reversible motor 2 rotates forward, as the gear 5 turns counterclockwise, the planetary gear 6 rotates clockwise which in turn causes the connector 22 to pivot about a shaft 5a in a counterclockwise direction until the planetary gear 6 engages the gear 7 of the winding system. Then, when the direction of rotation of the reversible motor 2 is reversed, the gear 5 rotates clockwise, and the planetary gear 6 starts to rotate counterclockwise, so that the connector 22 is turned about the shaft 5a in a clockwise direction by friction until the gear 6 engages the gear 12 of the rewinding system. A cutout gear 9 and a one-frame indexing disc 10 are both fixedly mounted on a common shaft 11a of the gear 11. A rack 13 meshes with the cutout gear 9 and operates in such a manner that as it slidingly moves in a reversed direction to that indicated by arrow B against the force of a spring 23, an arm portion 13b charges a shutter system (not shown). Then, the rack is latched in the advanced position. When a shutter release is actuated, as the rack 13 moves in the direction B under the action of the spring 23, another arm portion 13c with its end 13a functions to produce a winding start signal. A member 14 is arranged to slide in a direction indicated by arrow A against a spring 25 when a back cover 39 is being closed. An end 14a of the member 14 always abuts one arm 15a of a lever 15 which is urged by a spring 27 to turn about a pivot pin 15c in a counterclockwise direction. A changeover slide 16 is responsive to detection of the film end for changing over an electrical circuit from a winding configuration to a rewinding configuration. A latch member 17 has an upward extension 17b arranged for engagement with a downward extension 16b of the changeover slide 16 to latch the changeover slide 16. This latch member 17 is, as illustrated in FIG. 2(a), urged by a spring 28 to turn about a pivot shaft 17c in a counterclockwise direction and is in contact with the inner surface of the downward extension 16b of the changeover slide 16 all the time except when latching. A charge pawl 18 is positioned on the end of the lever 15 and arranged upon counter-clockwise movement by a spring 63 to charge the latch member 17 in a reversed direction to that indicated by arrow C. The charge pawl 18 operates as the slide member 14, when moved in the direction A, turns the lever 15 in the clockwise direction against a spring 27. A film container pressor 19 is provided at a pin 44 and urged in a clockwise direction by a spring (not shown). The tension of the film 20 when the film is at an end pulls the film container 21 in the winding direction, so that the pressor 19 is turned about the pivot pin 44 in a counterclockwise direction against the spring (not shown), thus giving off a rewinding start signal. Springs 23 to 28 are tension springs, and a pressure sensor 29 is provided for detecting the rewind signal from the film container pressor 19 when the film 20 comes to an end. As illustrated in FIGS. 2(a) to 2(b), this pressure sensor 29 lightly touches the film container pressor 19 by a compressed spring 45. A switch lever 30 is urged by spring 26 to turn about a shaft 30c in a clockwise direction, with its end 30a abutting on the periphery of the one-frame indexing disc 10 as illustrated in FIGS. 3(a)–(d). A circuit pattern substrate 31 includes winding, rewinding and short-circuiting patterns.

Figure 4:
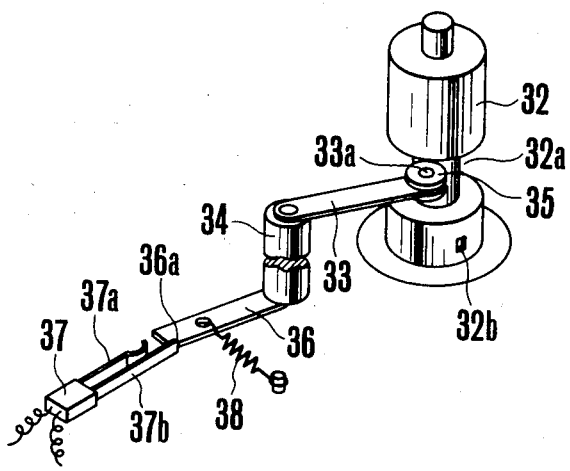
FIG. 4 is an enlarged, perspective view of an automatic rewind stopping device used in the embodiment of FIG. 1.
Figure 5:
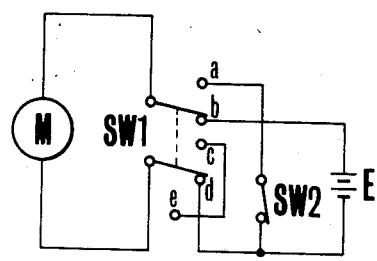
FIG. 5 is an electrical circuit diagram associated with a film transport system in the embodiment of FIG. 1.

FIG. 4 shows a spool 32 having a groove 32a; levers 33 and 36 forming part of a rewinding stop device; a rewinding stop lever shaft 34; a roller 35 rotatably mounted on the free end of the lever 33 at a shaft 33a; a normally closed type switch 37 for automatic stop of rewinding which corresponds to a switch SW2 of FIG. 5; and a spring 38 connected to the lever 36 by which the automatic rewinding stop device comprised of parts 33, 34, 35 and 36 is urged to be rotatable about the rewinding stop lever shaft 34 in a counterclockwise direction.

In FIG. 1, a gear 40 is rotatable clockwise in engagement with a gear train 43 of the rewinding system, and is fixedly mounted on one end of a shaft 40a, the opposite end of which carries a fork 41 in a pivotal relation about a pin 41a so that as the gear 40 rotates, the fork 41 can be rotated, these parts being positioned on a framework of the camera (not shown). Also, to allow for the film container 21 to be moved in the winding direction by the tension of the film when the film 20 comes to an end, the fork 41 is made pivotable about the pin 41a, and the outer diameter of the pin 41a and the inner diameter of the fork 41 differ from each other so that the fork 41 is slidable in the axial directions of the shaft 41a. A film container pressing shaft 44 has its bottom end mounted to the camera housing and its upper end mounted to the base plate (not shown). A switch 46 with sliding contacts fixedly mounted on the switch lever 30 has contact arms connected through respective lead wires 60 and 61 to a motor M as illustrated in FIGS. 3(a) to 3(d), and with the contacts 46a arranged to slide on a circuit pattern as the switch lever 30 operates, these parts constituting a switch SW1 of FIG. 5. A knob 47 enables the photographer to initiate rewinding at a desired time before the film is at an end, its head 47a being exposed out of the upper panel 62 of the camera housing. The knob 47 is slidable to a direction indicated by arrow D, so that a rod 47b pushes the pressure sensor 29, thus making it possible to effect manual setting of the rewinding mode. Pins 51 and 52 make it possible to slidingly move the member 14 in a direction indicated by arrow A; and a pin 53 makes it possible to slidingly move the changeover slide 16 in a direction indicated by arrow C, the pin 52 serving as the common pin of the member 14 and the changeover slide 16. Pins 54 and 55 make it possible to slidingly move the rack 13 in the direction indicated by arrow B; and pins 56 and 57 make it possible to slidingly move the pressure sensor 29 in the direction indicated by arrow C. The pins 51 to 57 are fixedly mounted on the camera housing.

Figure 3A:
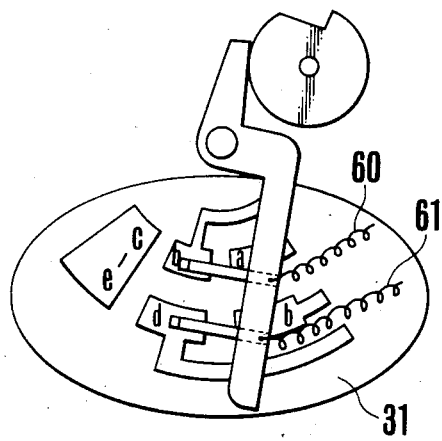
FIGS. 3(a)–3(d) are enlarged, plan views illustrating the various positions of a switching lever of a changeover mechanism in the embodiment of FIG. 1 relative to a circuit pattern.
Figure 3B:
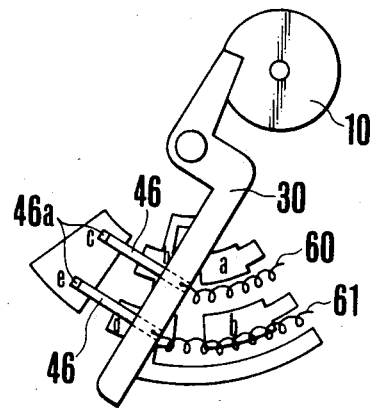
Figure 3C:
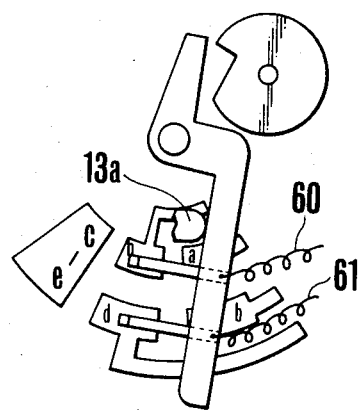

The operation of the above-described construction is next explained. At first the film container 21 is loaded into a chamber within the camera housing, while the leader of the film is attached to a perforation hook 32b in the lower half portion of the hub of the spool 32 (FIG. 4). Then, when the back cover 39 is closed, the member 14 is moved to the direction of arrow A against the spring 25, while its opposite end 14a turns the lever 15 by engagement with its lever end portion 15a in the clockwise direction against the spring 27. Such movement of the lever 15 causes the charge pawl 18 to urge the changeover slide 16 by engagement with the slide projected portion 16a in the opposite direction to that of arrow C, against the spring 24. As the back cover is entirely closed, when the member 14 reaches the end of its movement, the end of the charge pawl 18 has already been disengaged from the projected portion 16a of the changeover slide 16, but the changeover slide 16 is latched in the charged position by the latch lever 17 with its upward extension 17b engaging with the downward extension 16b of the changeover slide 16, thus completing the charging operation of the changeover slide 16. As the changeover slide 16 moves, the switch lever 30 is turned from the position of FIG. 3(d) in the clockwise direction under the action of the spring 26, so that the contacts 46a of the switch 46 on the switch lever 30 are shifted from the position of FIG. 3(d) to the position of FIG. 3(a), that is, from the rewinding circuit where the switch SW2 of FIG. 5 has so far been open on the circuit pattern substrate 31, to the winding circuit where the motor 2(M) is supplied with current in a forward direction to initiate a winding operation. Just before the film is advanced by one frame, the cutout portion 10a of the one-frame indexing disc 10 comes into alignment with the end 30a of the switch lever 30, and, as the end 30a starts to drop, the contacts 46a are moved from the winding circuit to a short-circuiting pattern where the current supply to the motor 2 is cut off. Inertia causes the motor 2 to rotate further. Then, when the switch lever end 30a reaches the bottom of the cutout 10a, the position of FIG. 3(b) is taken to terminate the winding operation. During this winding operation, motion of the motor 2 is transmitted through the gear train to the cutout gear 9 by which the rack 13 is moved against the spring 23 to the opposite direction of that of arrow B, while the arm portion 13b of the rack 13 charges the shutter system (not shown). The rack 13 is latched at the time when the charging operation is terminated. After actuation of a shutter release and the shutter has opened and closed, the rack 13 is released from the latching connection by a shutter closing signal, and is driven by the spring 23 to move in the direction of arrow B. Since, at this time, the teeth 13a' of the rack 13 face the cutout 9a of the gear 9, the rack 13 is allowed to move in the direction of arrow B, and the end 13a of the other arm portion 13c confronts the side surface 30e of the switch lever 30 and then turns the switch lever 30 in the counterclockwise direction against the spring 26 to the position of FIG. 3(c). In this position, the contacts 46a of the switch 46 lie on the lands b and d of the circuit pattern on the substrate 31, so that the motor is energized again to initiate the next cycle of the winding operation.

Figure 3D:
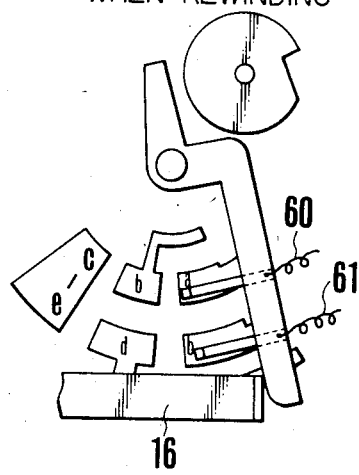

Such procedure repeats itself until the film is no longer fed. As the motor 2 rotates further, the film is tensioned, being pulled along with the film container in the winding direction. Accordingly, the pressor 19 is turned about the shaft 44 against the bias spring (not shown) in the counterclockwise direction. Such movement of the pressor 19 represents a winding start signal, and causes the pressure sensor 29 to move against the spring 45 (FIG. 2(a)) in the direction of arrow C. At this time, the upward extension 29a of the pressure sensor 29 pushes the latch member 17 of the changeover slide 16 at the downward extension 17a in the direction of arrow C, so that the latch member 17 is turned clockwise against the spring 28, and the upward extension 17b of the latch member 17 is moved away from the downward extension 16b of the changeover slide 16 to release the slide 16 from the latching connection. When released, the changeover slide 16 is pulled to the direction of arrow C by the spring 24, and the upward extension 16c pushes the switch lever 30 at the side surface 30d, wherein the sliding contacts 46a of the switch 46 are shifted to the lands a and b as illustrated in FIG. 3(d). Therefore, the current supply path to the motor 2 is reversed. As the motor 2 starts to rotate in the reverse direction, the gear 5 is turned in the clockwise direction by the gear train 42, and, therefore, the planetary gear 6 turns in the counterclockwise direction, thus turning the connector 22 by friction about the shaft 5a of the gear 5 in the direction of arrow D until the gear 6 engages with the gear 12 of the rewinding system. Then, the motion of the motor 2 is transmitted through the gear train 43 to the gear 40 and therefrom the the shaft 40 and fork 41, the latter being connected to the shaft 40a by the pivot pin 41a, to rewind the film on the supply spool in the cartridge 21. The, when the leader of the film is taken off of the spool 32, the roller 35 on the free end of the lever 33 of the automatic rewinding stop device (FIG. 4), which has so far been pressed against the film wound on the spool 32 by the spring 38, drops into the groove 32a in the spool 32, as the automatic rewinding stop device as a whole turns about the shaft 34. Accordingly, the end 36a of the lever 36 acts on the movable contact 37b of the normally closed type switch 37, and the rewinding circuit is cut off. Therefore, the current supply to the motor 2 no longer goes on, and the rewinding operation is automatically terminated.

If it happens that the photographer desires to rewind the film 20 before the prescribed number of frames have all been exposed, he needs only to slide the knob 47, with its head out of the camera housing 62, in the direction of arrow D in FIG. 2, so that the rod 47b acts on the upward extension 29a of the pressure sensor 29 and the pressure sensor 29 is moved, while the latch member 17 is forcibly contacted at its downward extension 17a by the upward extension 29a. Therefore, the latch member 17 is turned in the clockwise direction against the spring 28, with the upward extension 17b moving away from the downward extension 16b of the changeover slide 16. Since the changeover slide 16 is released from the latching connection with the latch member 17, as the changeover slide 16 moves in the direction of arrow C by the spring 24, the pawl of the switch lever 30 is taken out from the cutout 10a of the one-frame indexing disc 10 when the upward extension 16c of the changeover slide 16 turns the switch lever 30 by engagement with the side surface 30d in the counterclockwise direction against the spring 26. Therefore, the contacts 46a of the switch 46 are moved to the lands a and b of the rewinding circuit as illustrated in FIG. 3(d). Then, the motor 2 starts to rotate in the reverse direction, and the film 20 is rewound in a manner similar to that described in connection with the automatic transition to the rewinding mode at the time the film is at an end. After the rewinding, when the back cover 39 is opened, the member 14 is moved in the opposite direction to that of arrow A by the spring 25, while turning the lever 15 with its one end 15a abutting on the end 14a of the member 14, about the pivot pin 15c in the counterclockwise direction. Since, at that time, the changeover slide 16 has already been released from the latching connection with the latch member 17, and is returned to the initial position, as the lever member 15 then turns in the counterclockwise direction, the charge pawl 18 lying on the free end of the lever 15 abuts its side surface 18b against the left-hand side of the projected portion 16a of the changeover slide 16. The pawl is turned about the shaft 18c in the clockwise direction against the spring 63, and rides over the projected portion 16a. Then, the charge pawl turns about the shaft 18c in the counterclockwise direction by the action of the spring 63 until it abuts on a stopper on the lever 15. When the member 14 is stopped from movement by the spring 25, because its end 14a bears against one end of the lever 15, counterclockwise movement of the lever by the spring 27 also no longer proceeds. Since the charge pawl 18 on the end of the lever 15 is, as has been mentioned above, positioned as having ridden over the projected portion 16a of the changeover slide 16 to the right side thereof, it is again possible that with the back cover 39 closed after an exchange of the film cartridge 21, the above-described charging operation of the changeover slide 16 is repeated the prescribed number of times, and the automatic transition to the rewinding mode follows again.

As has been described in great detail, according to the present invention, the member for automatically switching the film transport mechanism from the winding position to the rewinding position is arranged to be rendered operative in response to opening and closing of the back cover, thereby giving an advantage that the otherwise necessary conventional R button is no longer required. Therefore, the photographer need not have to manually actuate such a button for the switching operation, thus making exchanging the film quick and easy.

The automatic transition control mechanism is of simple form such that when the film is at an end, a previously charged member changes over a switch from the winding circuit to the rewinding circuit, wherein the automatic control of transition to the rewinding mode is advantageously made accurate and reliable. In addition, there is provided a manual control member for effecting initiation of a rewinding of the film at a desired point in the length thereof. Therefore, without having to wait until the film is all wound up, the photographer is able at a desired time to rewind the film as necessity arises. Then the motor driven camera of the invention can be made very convenient to manage.

What is claimed is:

1. A camera having a motor drive for performing winding and rewinding operations on a film loaded in the camera so as to have a windable portion, including:
    a film transport mechanism for selectively winding and rewinding the loaded film,
    means for detecting an end of the windable portion of the loaded film to produce a termination signal,
    automatic changeover means responsive to said termination signal for changing over said film transport mechanism from a first state for the winding mode of operation to a second state for the rewinding mode of operation, a back cover on the camera for enabling the loaded film to be exchanged; and means responsive to closing of said back cover for setting said automatic changeover means in a condition to carry out the changing over operation.

2. A camera having a motor drive for performing winding and rewinding operations on a windable portion of film loaded in the camera, including:

a film transport mechanism for selectively winding and rewinding the loaded film, means for detecting an end of the length of loaded film to produce a termination signal, automatic changeover means responsive to said termination signal for changing over said film transport mechanism from a first state for the winding mode of operation to a second state for the rewinding mode of operation, a back cover on the camera for enabling the loaded film to be exchanged, means responsive to closing of said back cover for setting said automatic changeover means in an operative position, and operating means for releasing said setting means at a desired position of the loaded film before the detection of the end of the windable portion of loaded film, by said detecting means, said operating means actuating said detecting means to actuate said setting means.

3. A camera having a motor drive for performing winding and rewinding operations on a film loaded in the camera so as to have a windable portion, comprising:

first detection means for detecting completion of winding loaded film;

second detection means for detecting completion of an exposure operation;

third detection means for detecting an end of the windable portion of the loaded film;

control means for controlling rotation of the motor, said control means comprising switch means having a winding mode to normally rotate the motor, a braking mode to brake the motor and a rewinding mode to rotate the motor in reverse, said switch means being arranged to switch to the braking mode upon detection by the first detection means, to the winding mode upon detection by the second detection means, and to the rewinding mode upon detection by the third detection means.

* * * * *